J. LEVINESS & P. VANHORN,

Assignors to J. S. SANBORN.

Paper-Cutting Machine.

No. 9,054. Reissued Jan. 20, 1880.

Witnesses:

Theodore R. Shear.

George A. Hammel.

Inventors:

John Leviness.

and Preston Van Horn.

By James A. Shiton Atty

N. PETERS, PHOTO-LITHOGRAPHER WASHINGTON, D. C.

UNITED STATES PATENT OFFICE.

JOHN LEVINESS AND PRESTON VANHORN, OF BROOKLYN, NEW YORK, ASSIGNORS TO JOSEPH S. SANBORN, OF NEW YORK CITY.

PAPER-CUTTING MACHINE.

SPECIFICATION forming part of Reissued Letters Patent No. 9,054, dated January 20, 1880.

Original No. 124,690, dated March 19, 1872. Application for Reissue filed June 24, 1878.

*To all whom it may concern:*

Be it known that we, JOHN LEVINESS and PRESTON VANHORN, of Brooklyn, Kings county, New York, have invented, made, and applied to use certain Improvements in the Construction of Paper-Cutting Machines; and we do hereby declare that the following is a full, clear, and correct description of the same, reference being had to the accompanying drawings, making part of this specification, and to the letters of reference marked thereon, in which—

Figure 2:
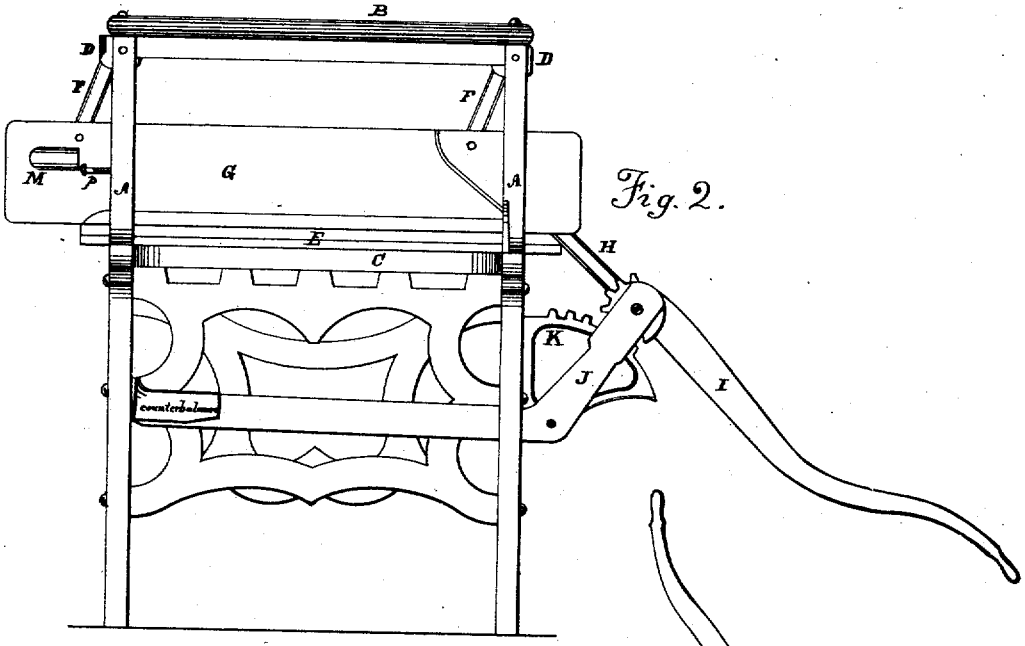
Figure 1:
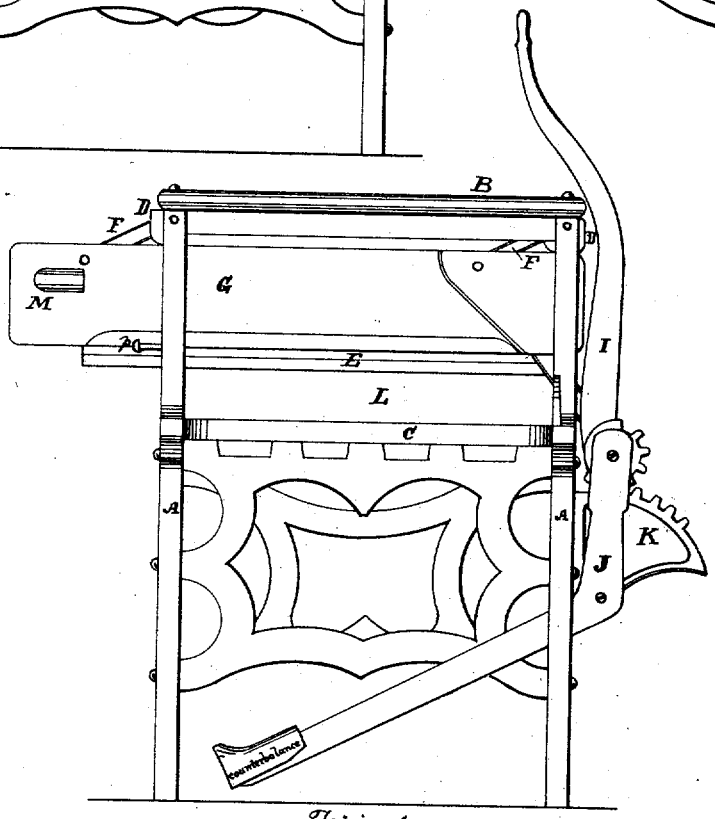

Figure 1 is a view of our improved paper-cutter, the knife being thrown up. Fig. 2 is a view of the same, the knife being depressed.

In the drawings like parts of the invention are designated by the same letters of reference.

The nature of the present invention consists in certain improvements in the construction of paper-cutting machines, as more fully hereinafter set forth, the object of the invention being more particularly to operate the knife of the machine readily and with the expenditure of as little power as possible.

To enable those skilled in the arts to make and use our invention, we will proceed to describe the construction and operation of the same.

A shows the frame of the machine, provided with a cross-head, B, and with a table, C, upon which the paper to be cut is placed. D shows boxes inserted in the sides of the frame, which boxes D are adjustable, and have pivoted within them the ends of the links F, the opposite ends of which are attached to the knife-bar G, in the lower portion of which is held the knife E.

H shows a connection, one end of which is pivoted within the knife-bar G at the same point at which one of the links F is pivoted, while its opposite end is passed through the partially-slotted end of the curved lever I, a pin being passed through the lever and the connection.

I shows a curved lever, made of any desired length, the lower end of which is geared and partially slotted to receive one end of the connection H.

J shows a link and counter-balance combined, the link receiving the geared end of the lever I, by which the machine is operated, and being pivoted, so as to move freely, to the lower portion of a segment-rack, K, at a point which forms the center of the same.

K shows a segment-rack secured to the frame A, with which rack the geared end of the lever I engages as the lever is depressed and elevated.

L shows a clamp secured in the side frame, employed to clamp the paper, and operated in the usual way.

M is a stop secured upon the face of the knife-bar, which, when the knife is depressed, is brought into contact with a set-screw, *p*, secured in the side frame.

Such being the construction, the operation is as follows: The paper to be cut is placed upon the table C of the machine, and is clamped in position by depressing the clamp L. The lever I is then depressed by the operator, its geared end engaging with the segment-rack, and through the connection attached to the knife-bar, as shown, the same is drawn down, carrying the knife through the paper to be cut. By elevating or raising the lever the knife-bar and knife are relieved from the paper.

The counter-balance employed serves to keep the knife elevated until the lever is depressed, and when the knife has been depressed assists it in its return.

It will be observed that by using a segment-rack and gearing the end of the curved lever which engages with the rack the knife is easily and readily depressed and elevated, and that but little power is required to operate the machine. While the position of the geared end of the lever being adjustable at pleasure, so that it may engage with the segment-rack at any desired point, the operator, should he have a small quantity of paper to cut, may, by adjusting the lever to the rack, cut the same with a shorter movement of the lever.

The invention herein described is an improvement of paper-cutting machines, and particularly of a machine for cutting paper shown in Letters Patent No. 117,650, dated August 1, 1871, granted to John Leviness, of Brooklyn, New York, one of the inventors of the improvements herein described. In that invention the operating-lever is hung or pivoted to an adjustable yoke, made adjustable to accommodate the relative positions of the knife adjusted by the T-boxes sliding in the frame.

This invention differs from that in the substitution for the adjustable yoke of an adjustable fulcrum consisting of the periphery of a segment-rack for the bearing of the lever attached to and moving on the segment and periphery of sufficient length or arc to act as a fulcrum, from which the lever moves the knife-bar suspended by the links over the required distances and with the required power, which, of course, increases as the suspending-links approach the perpendicular and the stress on the knife and paper is greatest.

Having now set forth our invention, what we claim as new is—

1. The following elements combined in a paper-cutting machine: first, a knife-bar having both a downward and an endwise motion for cutting; second, a segment-periphery for the bearing of the lever operating the knife-bar, located in the plane of the knife-bar, and of its movement in cutting and returning to position; third, a lever connected to the knife-bar, the fulcrum end of which rests in or on the segment-periphery and moves back and forth thereon in operating the knife-bar.

2. In a paper-cutting machine, a lever, I, which has its three essential points for power, fulcrum, and weight or pressure moving automatically in the same plane, or in a plane parallel with the knife-bar of a paper-cutting machine, in combination with the knife-bar G, adjusted to move in a diagonal downward direction in cutting, to which it is connected and which it operates.

3. The following elements in combination: first, a knife-bar moved in diagonal lines to make draw-cuts; second, a lever connected to the knife-bar by link; third, a rack-fulcrum which receives the toothed end of the lever, and on which the lever moves to operate the knife-bar in the same plane with the knife-bar.

4. The knife-bar G and segment-rack K, in combination with the lever I, having a toothed end operating in connection with the segment-rack, and secured to the frame and knife-bar by links H and J, substantially as described.

5. The lever I, segmental fulcrum K, knife-bar G, links F, and connection H, in combination.

6. In a paper-cutting machine provided with a knife having a diagonal or draw-cut movement, a lever provided with a toothed bearing-surface, a toothed segment-surface, upon which the toothed bearing-surface of the lever bears and moves to and fro, and a movable link arranged to secure the two toothed surfaces together, all in combination, and connected to the knife-bar for the purpose of moving the same to and fro for cutting.

7. In a paper-cutting machine provided with a knife having a diagonal or draw-cut movement, a bar-lever, I, provided with a toothed segment bearing-surface which engages with a corresponding toothed segment-surface, on which the toothed surface of the bar-lever moves and describes a part of a circle for the purpose of imparting motion to the knife, substantially as shown and described.

8. In a paper-cutting machine provided with a knife having a diagonal or draw-cut movement, a bar-lever provided with a toothed bearing-surface which engages with a corresponding toothed surface, on which the toothed surface of the bar-lever moves and describes a part of a circle for the purpose of imparting motion to the knife, substantially as shown and described.

9. In a paper-cutting machine provided with a knife having a diagonal or draw-cut movement, a bar-lever provided with a rolling bearing-surface which engages with a corresponding surface, on which the bearing-surface of the bar-lever moves and describes a part of a circle for the purpose of imparting the motion to the knife, substantially as shown and described.

JOHN LEVINESS.
PRESTON VANHORN.

Witnesses to the signature of John Leviness:
W. H. WILLIS, Jr.,
GEO. H. SANBORN.

Witnesses to the signature of Preston Vanhorn:
FRANK MCBRIDE,
GEO. H. SANBORN.